(12) United States Patent
Ferneley

(10) Patent No.: US 11,613,379 B2
(45) Date of Patent: Mar. 28, 2023

(54) HARD LANDING INDICATOR FOR AN AIRCRAFT LANDING GEAR

(71) Applicant: BOMBARDIER INC., Dorval (CA)

(72) Inventor: John J. C. Ferneley, Etobicoke (CA)

(73) Assignee: BOMBARDIER INC.

( * ) Notice: Subject to any disclaimer, the term of this patent is extended or adjusted under 35 U.S.C. 154(b) by 530 days.

(21) Appl. No.: 16/668,865

(22) Filed: Oct. 30, 2019

(65) Prior Publication Data

US 2020/0140117 A1    May 7, 2020

Related U.S. Application Data

(60) Provisional application No. 62/756,779, filed on Nov. 7, 2018.

(51) Int. Cl.
*B64D 45/00*    (2006.01)
*B64C 25/02*    (2006.01)

(52) U.S. Cl.
CPC .............. *B64D 45/00* (2013.01); *B64C 25/02* (2013.01); *B64D 2045/008* (2013.01)

(58) Field of Classification Search
CPC .............. B64D 45/00; B64D 2045/008; B64D 45/0005; B64C 25/02; B64C 25/04
See application file for complete search history.

(56) References Cited

U.S. PATENT DOCUMENTS

| 4,278,219 | A | * | 7/1981 | Finance | ................ | G01P 15/036 |
| | | | | | | 244/129.1 |
| 8,616,146 | B2 | | 12/2013 | Martin et al. | | |
| 9,272,792 | B2 | | 3/2016 | Hodgkinson et al. | | |
| 11,142,336 | B2 | * | 10/2021 | Farcy | ...................... | B64C 25/60 |
| 2011/0214601 | A1 | * | 9/2011 | Martin | .................... | B64D 45/00 |
| | | | | | | 116/203 |
| 2016/0137294 | A1 | | 5/2016 | Lacy et al. | | |

FOREIGN PATENT DOCUMENTS

| EP | 2368797 | | 9/2011 | | |
| GB | 2453554 | A * | 4/2009 | ............. | B64C 25/34 |
| GB | 2485803 | | 5/2012 | | |

* cited by examiner

*Primary Examiner* — Valentina Xavier
(74) *Attorney, Agent, or Firm* — Norton Rose Fulbright Canada

(57) ABSTRACT

A hard landing indicator mountable to a landing gear of an aircraft is provided. The landing gear has components displaceable toward each other upon the aircraft experiencing a landing. The hard landing indicator includes a first portion securable to one of these components and a second portion that projects outwardly from the first portion and oriented toward another component of the landing gear to be positioned within a path of displacement of the second component toward the first component. The second portion is impacted by this component upon this component being displaced during a hard landing of the aircraft. The impact leaves a visual mark on the second portion of the hard landing indicator to indicate that a hard landing has occurred. A landing gear equipped with and a method of installing such indicator are also provided.

19 Claims, 4 Drawing Sheets

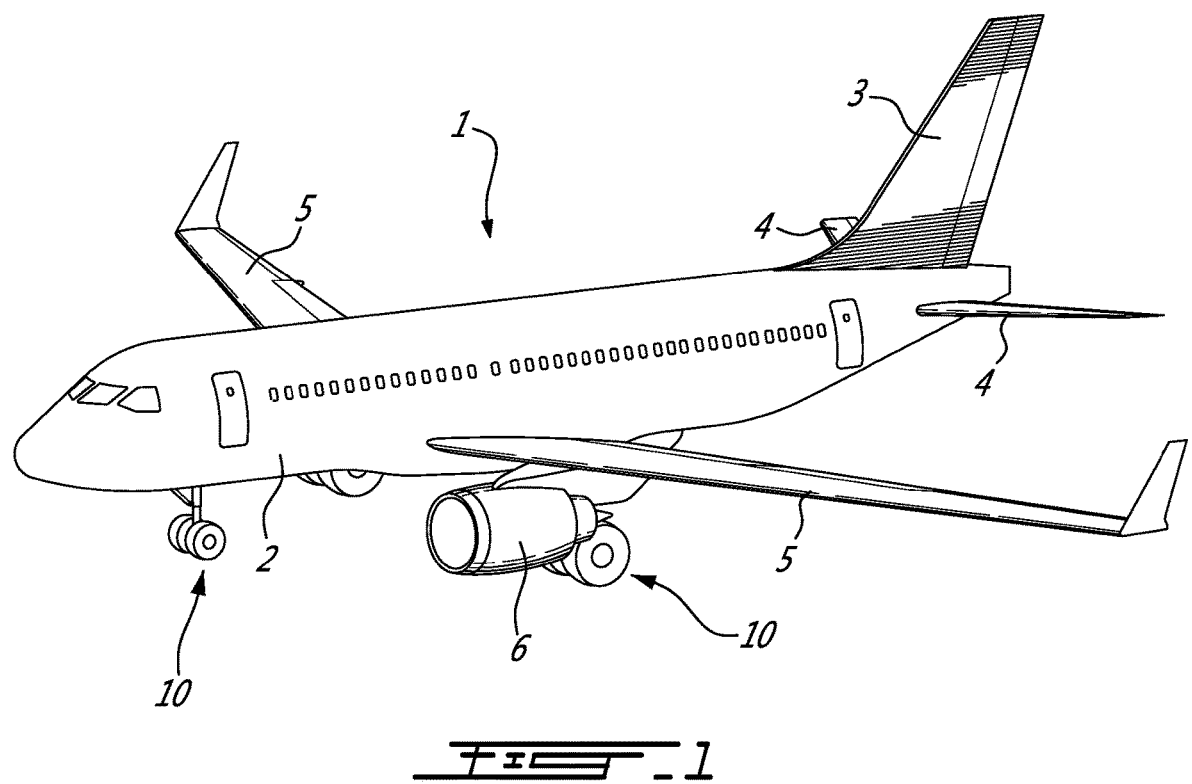

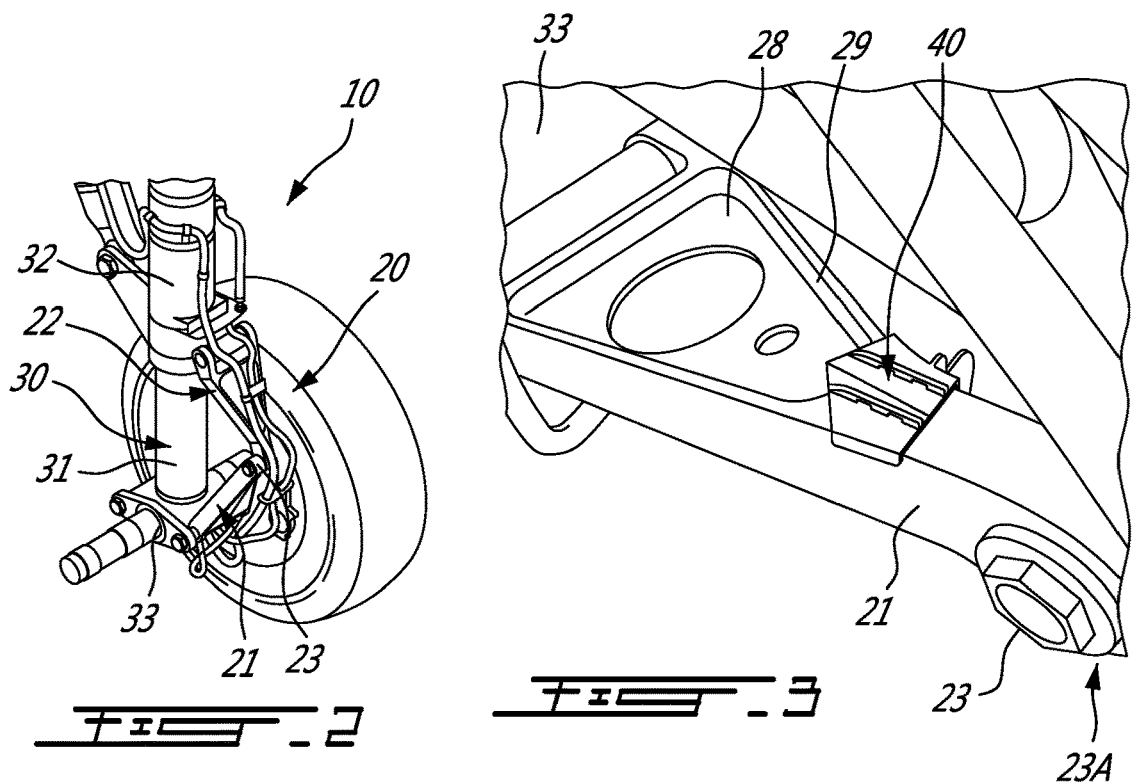
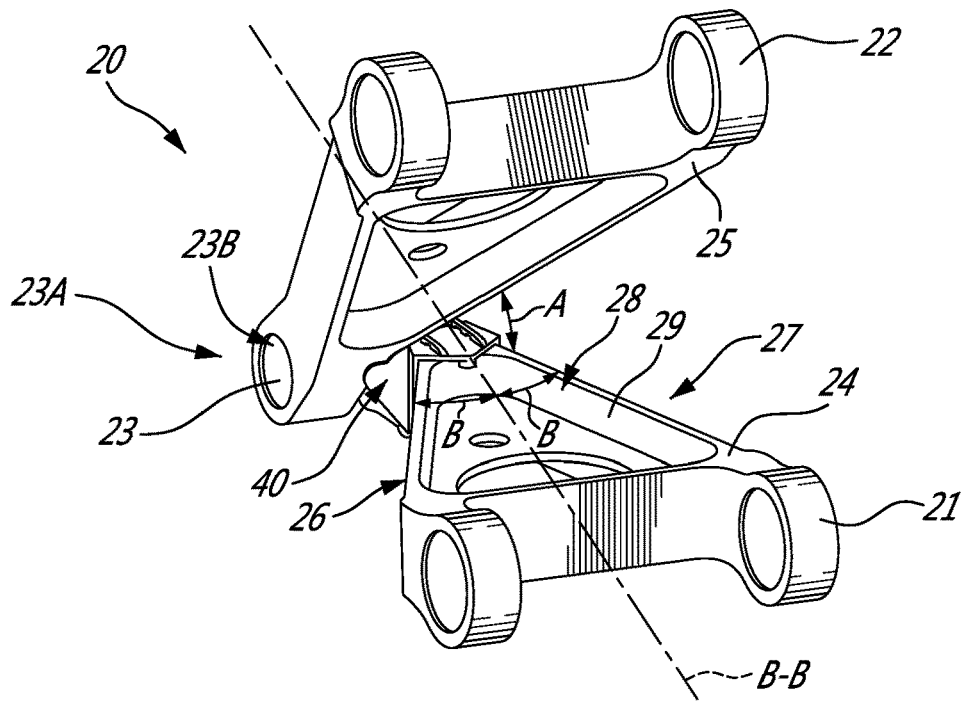

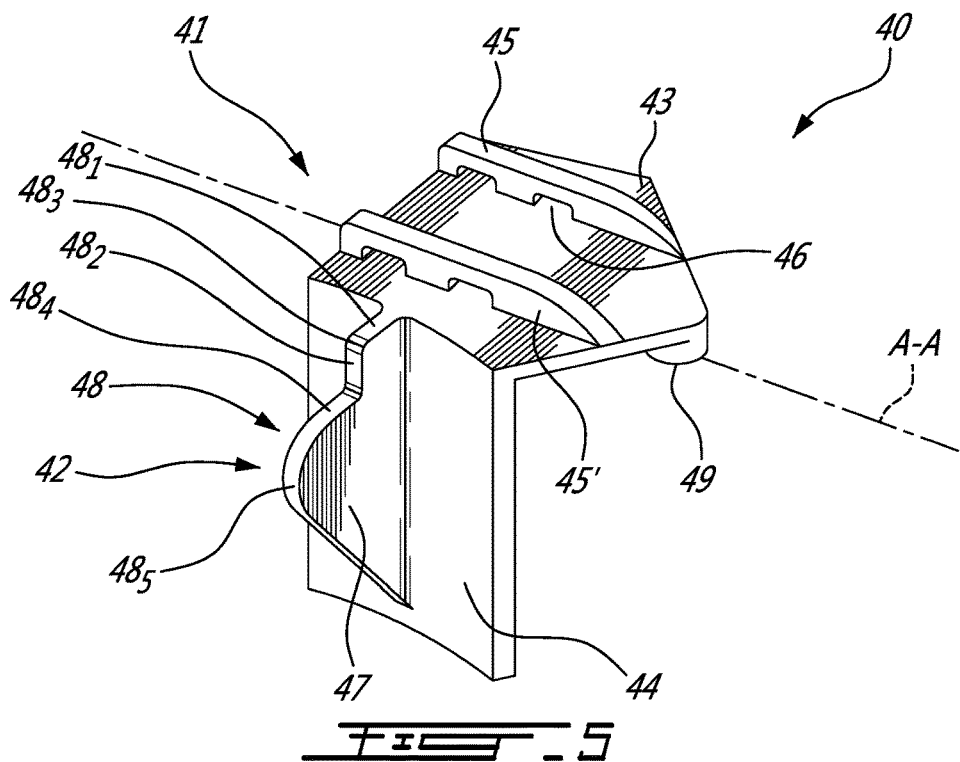
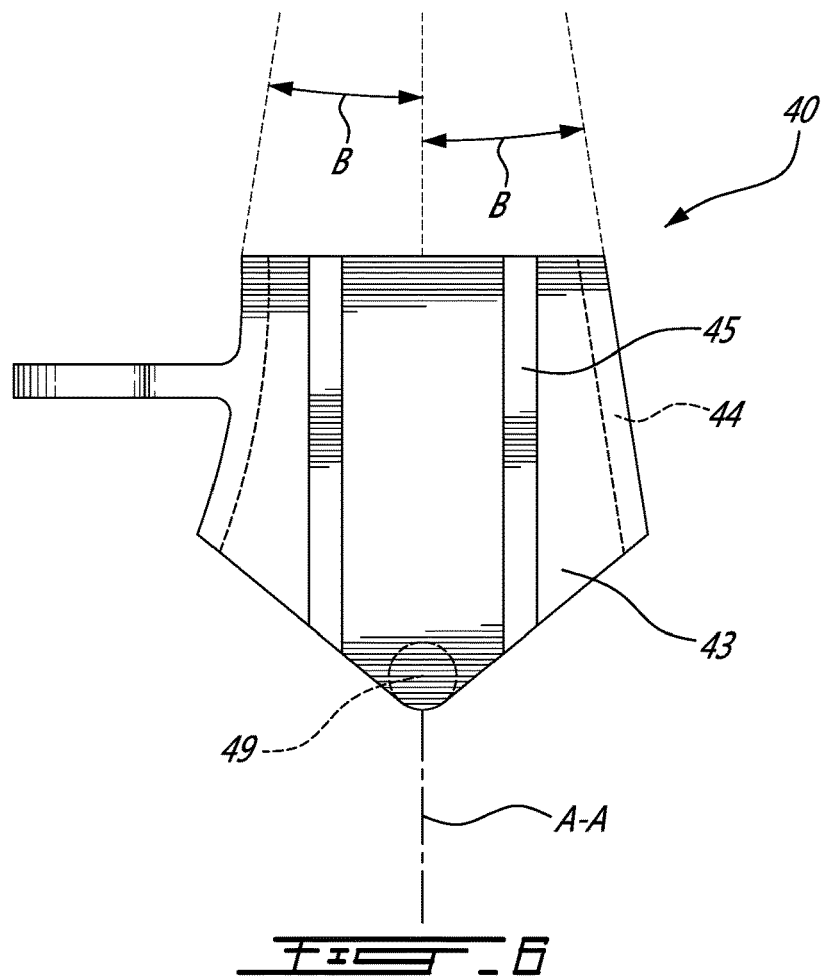

HARD LANDING INDICATOR FOR AN AIRCRAFT LANDING GEAR

CROSS-REFERENCE TO RELATED APPLICATIONS

This application claims priority to U.S. provisional patent application 62/756,779 filed on Nov. 7, 2018, the entire contents of which are incorporated by reference herein.

TECHNICAL FIELD

The application relates generally to an aircraft landing gear and, more particularly, to devices and a method for detecting hard landings.

BACKGROUND

Reliable ways to visually detect that an aircraft has experienced a hard landing are limited. Typically, pilots and/or aircraft/maintenance crews will visually inspect the aircraft during a pre-flight walk-around. However, a simple visual inspection may not always reveal whether a hard landing has occurred. When a hard landing is suspected to have occurred, the Flight Data Recorder (FDR) may be analyzed. Such analysis generally requires removing the aircraft from service and represents considerable time for the pilot and/or aircraft/maintenance crews to review the FDR in order to validate that a hard landing was experienced by the aircraft, which may cause significant expenses/financial loss for airline companies and/or aircraft owners.

SUMMARY

In one aspect, there is provided a landing gear for an aircraft, comprising: a torque link assembly including an upper torque link and a lower torque link hingedly connected to one another at a common pivot, the upper and lower torque links being displaceable toward one another upon the aircraft experiencing a landing; a hard landing indicator secured to one of the upper and lower torque links and having a part oriented toward the other one of the upper and lower torque links, the other torque link impacting the part upon the other torque link being displaced toward the hard landing indicator by a hard landing of the aircraft, an impact of the other torque link with the part leaving a visual mark thereon.

In an embodiment, the hard landing indicator includes a first portion secured to the one of the upper and lower torque links, and a second portion projecting outwardly from the first portion toward a path of displacement of the other torque link to be impacted thereby.

In an embodiment, the first portion includes a main plate and at least one side plate projecting from a side of the main plate away from the other torque link, the second portion projecting outwardly from the at least one of side plate toward the path of displacement of the other torque link, the second portion being transverse to the at least one side plate.

In an embodiment, the hard landing indicator is secured to the lower torque link, the lower torque link having an upper surface, a lower surface and side surfaces extending between the upper and lower surfaces, the main plate abutting the upper surface and the at least one side plate abutting one of the side surfaces of the lower torque link.

In an embodiment, the side surfaces of the lower torque link extend obliquely relative to each other between opposite first and second longitudinal ends of the lower torque link, the at least one side plate of the hard landing indicator being oblique relative to a longitudinal axis of the hard landing indicator.

In an embodiment, the lower torque link includes a recessed region spaced inwardly from the upper surface and between the side surfaces, the recessed region delimited by a recess wall extending inwardly from the upper surface, the hard landing indicator having a projection extending outwardly from an inner surface of the main plate, the projection abutting against the recess wall of the recessed region.

In an embodiment, the second portion of the hard landing indicator is a tab, the tab extending from the at least one side plate toward the path of displacement of the other torque link and being transverse to said side plate.

In an embodiment, the tab has opposite first and second side surfaces and a peripheral surface extending between the first and second side surfaces, a portion of the peripheral surface receiving the impact from the other torque link upon the aircraft experiencing the hard landing.

In an embodiment, the main plate includes at least one flange, the at least one flange extending along a length of the main plate and projecting from an outer surface thereof.

In an embodiment, at least one slot is defined through the at least one flange, the landing gear comprising an attachment means inserted through the slot to attach the hard landing indicator to the one of the upper and lower torque links.

In another aspect, there is provided a hard landing indicator mountable to a landing gear of an aircraft, the landing gear having first and second components displaceable toward each other upon the aircraft experiencing a landing, the hard landing indicator comprising: a first portion securable to the first component of the landing gear; a second portion projecting outwardly from the first portion and oriented toward the second component of the landing gear to be positioned within a path of displacement of the second component toward the first component, the second portion being impacted and marked by the second component upon the second component being displaced by a hard landing of the aircraft.

In an embodiment, the first portion includes a main plate and at least one side plate projecting from a side of the main plate, the second portion projecting outwardly from and being transverse to the at least one side plate.

In an embodiment, the at least one side plate is oblique relative to a longitudinal axis of the hard landing indicator, an acute angle being defined between the at least one side plate and the longitudinal axis.

In an embodiment, the main plate and the at least one side plate are integrally molded with one another.

In an embodiment, the second portion is a tab having opposite first and second side surfaces and a peripheral surface extending between the first and second side surfaces, a portion of the peripheral surface receiving the impact from the second component of the landing gear upon the aircraft experiencing the hard landing.

In an embodiment, the main plate includes at least one flange, the at least one flange extending along a length of the main plate and projecting from an outer surface thereof.

In an embodiment, at least one slot is defined through the at least one flange for receiving an attachment means to attach the hard landing indicator to the first component of the landing gear.

In an embodiment, the hard landing indicator further comprises a projection extending outwardly from an inner surface of the main plate, the projection abutting against a portion of the first component of the landing gear upon securing the hard landing device thereon.

In another aspect, there is provided a method for installing a hard landing indicator on a landing gear of an aircraft, the landing gear including first and second components hingedly connected to one another and displaceable towards each other, the method comprising: securing a first portion of the hard landing indicator on the first component of the landing gear to position a second portion of the hard landing indicator projecting outwardly from the first portion within a path of displacement of the second component of the landing gear toward the first component.

In an embodiment, securing the first portion includes preventing the hard landing indicator from being displaced along the first component of the landing gear.

In an embodiment, preventing the hard landing indicator from being displaced includes preventing the hard landing indicator from being displaced along a length of the first component.

In an embodiment, preventing the hard landing indicator from being displaced includes preventing the hard landing indicator from being displaced along a width of the first component.

In an embodiment, preventing the hard landing indicator from being displaced along the length of the first component includes abutting a portion of the hard landing indicator against a wall of the first component delimiting a recessed area of the hard landing indictor.

In an embodiment, securing the first portion of the hard landing indicator on the first component includes wrapping an attachment means at least partially about the first portion and about the first component of the landing gear, and tightening the attachment means to immovably secure the hard landing indicator to the first portion of the landing gear.

In another aspect, there is provided a method of observing a landing gear of an aircraft, the method comprising: verifying visually a hard landing indicator secured to a first component of the landing gear for a visible marking on the hard landing gear, the visible marking being indicative of a hard landing of the aircraft and caused by an impact of a second component of the landing gear with the hard landing indicator due to a pivotable displacement of the second component toward the first component during the hard landing of the aircraft.

In an embodiment, the method further comprises concluding an absence of the hard landing of the aircraft when the visible marking is absent from the hard landing indicator.

The aspects and embodiments described above may be

DESCRIPTION OF THE DRAWINGS

Reference is now made to the accompanying figures in which:

FIG. 1 is a schematic tridimensional view of an aircraft;

FIG. 2 is a perspective view of a landing gear of the aircraft shown in FIG. 1;

FIG. 3 is a perspective view of a portion of a torque link assembly of the landing gear shown in FIG. 2;

FIG. 4 is another perspective view of the torque link assembly of FIG. 3, shown with a hard landing indicator;

FIG. 5 is a perspective view of the hard landing indicator of FIG. 4;

FIG. 6 is a top view of the hard landing indicator of FIG. 4;

DETAILED DESCRIPTION

Figure 7:
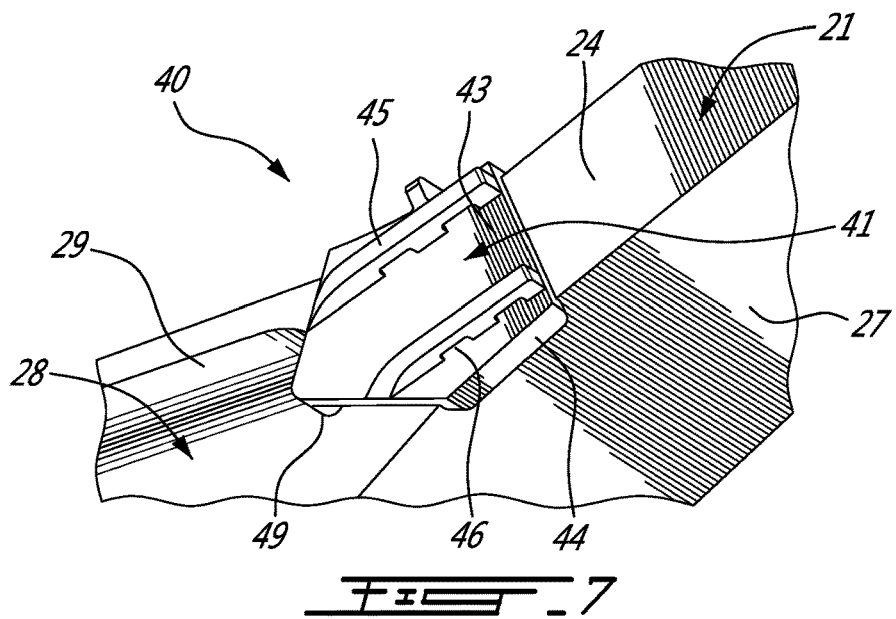
FIG. 7 is a perspective view of the hard landing indicator of FIG. 4 mounted on a component of the torque link assembly shown in FIG. 3.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the wings 5 in the depicted embodiment, although for other aircraft they can be mounted to the fuselage 2. The aircraft 1 also has landing gears 10, shown schematically in FIG. 1. The aircraft 1 is shown as a jet-engine aircraft, but may also be a propeller aircraft. It is also understood that the aircraft 1 can be a business aircraft, alternately it can be any other type of aircraft, manned or unmanned, including, but not limited to, a commercial aircraft or a military aircraft.

Referring to FIGS. 2 to 4, one type of landing gear 10 for the aircraft 1 includes a torque link assembly 20 and a strut shock 30. The torque link assembly 20 may include a first component 21 and a second component 22 hingedly connected to one another. In the depicted embodiment, the first component is a lower torque link 21 and the second component is an upper torque link 22. The lower torque link 21 and the upper torque link 22 are hingedly connected to one another and displaceable toward one another upon the landing gear 10 experiencing a landing.

The lower and upper torque links 21, 22 are connected together at one of their respective ends. A hinge 23A is defined between the lower and upper torque links 21, 22. The hinge 23A includes an axle 23 and openings 23B in adjacent ends of the lower and upper torque links 21,22. The axle 23 extends through the openings 23B to connect the lower and upper torque links 21, 22 to one another at their respective ends and implements a common rotating axis such that the lower and upper torque links 21, 22 may angularly displace towards and away from one another in a scissor-like fashion (i.e. as the blades of a scissor typically do). The lower and upper torque links 21, 22 are pivotable about the axis defined by the axle 23 towards and away from each other. The axle 23 is mounted in the openings 23B with or without an additional bearing (e.g. slide bearing, ball bearings, etc.) to facilitate rotation of the axle 23 and in turn the scissor-like movement of the lower and upper links 21, 22.

The lower torque link 21 and/or the upper torque link 22 have a first surface 24 defined by a first wall, which may be an upper surface or upper wall, a second surface 25 defined by a second wall, which may be a lower surface or lower wall, and opposite third and fourth surfaces 26, 27, which may be opposite side surfaces or opposite side walls. The following description is of the lower torque link 21, it being understood that the upper torque link 22 may have similar features to these described hereafter. The lower torque link 21 in the depicted embodiment includes a recessed region 28 spaced inwardly from the first surface 24 and between the third and fourth surfaces 26, 27. The recessed region 28 is delimited by a recess wall 29 extending inwardly from the first surface 24. The recess wall 29 circumscribes the recessed region 28. The presence of the recess 28 helps to reduce the weight of the lower torque link 21, and thus of the torque link assembly 20. The surfaces 24, 25, 26, 27 are planar surfaces (partially or entirely planar) in the depicted embodiment, and in alternate embodiments they may include portions with irregular reliefs. As shown in FIG. 4, the opposite side surfaces 26, 27 extend obliquely relative to each other between opposite first and second longitudinal ends of the lower torque link 21. Each of the side surfaces 26, 27 extend in directions that diverge away from the hinge axle 23. The side surfaces 26, 27 are not parallel to one another. An acute angle is defined between the side surfaces 26, 27. An acute angle B is also defined between the side surfaces 26, 27 and a longitudinal axis B-B of the lower torque link 21. Stated differently, side surfaces 26, 27 each extend between both ends of the lower torque link 21 in non-parallel directions, such that, viewed from the top, the lower torque link 21 is wider at one longitudinal end than at its other longitudinal end. In other words, side surfaces 26, 27 of the lower torque link 21 extend such that their respective planes converge toward a common point. The lower or upper torque link 21, 22 may be shaped differently in other embodiments.

The lower and upper torque links 21, 22 are connected at another one of their respective ends to portions of the landing gear 10. Referring to FIG. 2, the lower torque link 21 is connected to a strut shock movable portion 31, which may be a piston of the strut shock 30. The lower torque link 21 in FIG. 2 is connected to a wheel mounting axle assembly 33 to which wheels of the landing gear 10 are secured. The upper torque link 22 is connected to a stationary shock strut cylinder 32 of the strut shock 30. In an alternate embodiment, the upper torque link 22 is connected directly to another supporting structure of the landing gear 10.

During a landing, the wheels and the wheel mounting axle assembly 33 connected to the movable portion 31 of the strut shock 30 move vertically upward and their movement is absorbed within the shock strut cylinder 32 to reduce a vertical acceleration of the aircraft 1. Since the lower and upper torque links 21, 22 are connected to respective portions of the strut shock 30 and hingedly connected to one another, a relative vertical movement between the strut shock movable portion 31 and the stationary shock strut cylinder 32 results in a compressed state of the strut shock 30 causing the lower and upper torque links 21, 22 to pivot towards each other. As such, a space (i.e. a generally triangular space) defined between the lower and upper torque links 21, 22 diminishes. Stated differently, and referring to FIG. 4, an angle A between the lower and upper torque links 21, 22 is reduced as they pivot toward each other. It will therefore be appreciated that the pivoting displacement of the lower and upper torque links 21, 22 is a relative displacement, in that the lower and upper torque links 21, 22 are brought closer together by either one or both of the lower and upper torque links 21, 22 experiencing displacement.

As the lower and upper torque links 21, 22 pivot toward each other, the side surface 26,27 of the upper torque link 22 is brought closer to the a corresponding side surface 26,27 of the lower toque link 21. During initial pivoting displacement of the lower and upper torque links 21, 22 toward each other, the adjacent side surfaces 26,27 do not interfere with each other. After further displacement, the side surfaces 26,27 scissor very close to one another and may even contact one another. It will thus be appreciated, and as further described below, that an object positioned in this path of displacement of the lower and upper torque links 21, 22 toward each other will be impacted by one of the torque links 21, 22.

In certain situations, the aircraft 1 may experience a "hard" landing. A hard landing is not a typical landing of the aircraft 1. It is usually an exceptional occurrence and corresponds to a landing during which a vertical acceleration threshold of the aircraft 1 is exceeded. When a hard landing occurs, the strut shock 30 may compress more than it would during a standard or normal landing. For example, the distance over which the strut shock 30 may compress during a hard landing may be greater than 12.75 inches, in some cases as much as 13 inches, depending on the types of landing gear, the landing gear arrangement and/or types of aircraft. In contrast, and again as an example, when no hard landing is experienced and thus a normal landing of the aircraft 1 occurs, the strut shock 30 may compress a distance of only 11.75 inches. In some cases, a hard landing of the aircraft 1 may result in structural damage to portions of the landing gear 10 or other portions of the aircraft 1.

If pilots and/or maintenance crews suspect that a hard landing occurred, they may visually inspect the aircraft during a walk-around to visually detect any structural damage caused by the potential hard landing. Relying on a pilot's or maintenance crew's experience to determine when a hard landing has occurred may result in judgment errors. For instance, the pilot may incorrectly determine that no hard landing had occurred when there actually was one, which may result in flight of an aircraft which is not flightworthy. Conversely, the pilot may incorrectly determine that a hard landing has occurred, which may lead to unnecessary maintenance assessments and flight delay. From time to time, for greater certainty, pilots and/or maintenance crews may have to review and analyze the Flight Data Recorder (FDR) to determine whether a hard landing actually occurred. However, this may be time consuming and incur huge expenses for the airliner companies and/or the aircraft owner(s).

Disclosed herein is a device and a method for detecting a hard landing of the aircraft 1 visually and easily that may be applicable to various types of landing gears 10.

Referring to FIGS. 3 and 4, a hard landing indicator 40 is shown mounted and secured to the landing gear 10. The indicator 40 may be attached to the main or the nose landing gear 10 of the aircraft 1. As will be explained in greater detail below, the hard landing indicator 40 provides a visible indication of a hard landing of the aircraft 1. This visible indication can be viewed by a pilot and/or maintenance crew during their visual inspection of the aircraft 1, and will indicate to them that a hard landing of the aircraft 1 occurred. The hard landing indicator 40 is secured to a component of the landing gear 10. In the depicted embodiment, the hard landing indicator 40 is secured to one of the upper and lower torque links 21, 22 of the torque assembly 20. In alternate embodiments of the landing gear, the hard landing indicator 40 may be secured to other components. For example, in the embodiment where the landing gear 10 is a "trailing arm" type landing gear, the hard landing indicator 40 may be secured to a portion of the trailing arm, for instance.

FIGS. 5 and 6 show an embodiment of the hard landing indicator 40. The hard landing indicator 40 has a base or first portion 41 securable to the first component of the landing gear 10 such as the lower torque link 21, and a second portion 42 projecting outwardly from the first portion 41. The second portion 42 projects outwardly from the first portion 41 toward a path of displacement of the upper torque link 22 toward the lower torque link 21. As such, the second portion 42 is positioned such that the side surface 26, 27 of the upper torque link 22 of the landing gear 10 will impact the second portion 42 during a hard landing of the aircraft 1 when the upper torque link 22 is displaced toward the lower torque link 21. As a result of this impact, the upper torque link 22 will leave a visual and visible mark on the second portion 42 of the hard landing indicator 40. In an alternate embodiment, the first portion 41 of the hard landing indicator 40 is secured to the upper torque link 22, and the second portion 42 is positioned to receive an impact from the lower torque link 21 in the case of a hard landing. In other embodiments, the first and second components of the landing gear 10 may be parts of a trailing arm landing gear, such as the trailing arm itself, the structural post and/or other structural bracings of the trailing arm landing gear.

The first and second portions 41, 42 of the hard landing indicator 10 may take different forms. In FIGS. 5 and 6, the first portion 41 includes a main plate 43 and at least one side plate 44 projecting from a side of the main plate 43. When mounted on one of the lower and upper torque links 21, 22, the main plate 43 abuts the upper surface 24 of the torque link 21, 22, and the side plate 44 abuts one of the side surfaces 26, 27 of the torque link 21, 22. The side plate 44 is transverse to the main plate 43. The side plate 44 has an orientation which is non-parallel to the longitudinal axis A-A of the hard landing indicator 40. The orientation of the side plate 44 conforms to the obliquely extending side surface (26 or 27) of the torque link 21, 22 against which the side plate 44 abuts. For instance, the side plate 44 may lie in a plane that intersects the longitudinal axis A-A and is non-parallel or oblique to the longitudinal axis A-A. The angle between the plane defined by the side plate 44 and the longitudinal axis A-A is substantially the same acute angle as that between the side surface 26, 27 and the longitudinal axis B-B of the lower torque link 21, discussed above.

As better shown in FIG. 7, the first portion 41 includes a pair of opposite side plates 44 projecting from spaced-apart sides of the main plate 43. Each one of the side plates 44 abuts one of the side surfaces 26, 27 of the torque link 21, 22. The pair of side plates 44 extend obliquely relative to each other to conform to the obliquely extending side surfaces 26, 27. As shown, a first one of the side plates 44 includes the second portion 42 of the hard landing indicator 40, and a second one of the side plates 44 is substantially smaller than the first one of the side plates 44. The second one of the side plates 44 may be referred to as a lip for abutting against the other side surface 26, 27 not already abutted against by the first one of the side plates 44. In some variants, the second one of the side plates 44 may be the same size as the first one of the side plates 44 (or substantially the same size). The hard landing indicator 40 may also be mounted differently. For instance, the main plate 43 may abut the lower surface 25 of the torque link on which it is mounted, and the side plate 44 may abut one of the side surfaces 26, 27 of the torque link. As such, the hard landing indicator 40 may be mounted under the upper torque link 22, for instance, and may still have its second portion 42 projecting outwardly toward the path of displacement of the upper torque link 22.

Figure 9:
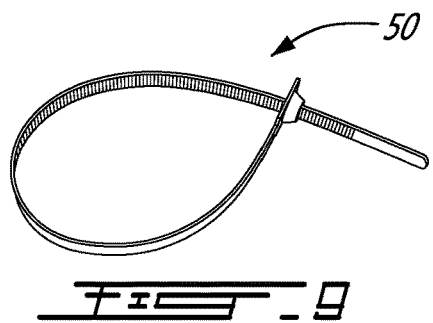
FIG. 9 is an example of attachment means for attaching the hard landing indicator to a component of the landing gear.

Still referring to FIGS. 5 and 6, the main plate 43 includes one or more flanges 45. Each flange 45 extends in a direction substantially parallel to the longitudinal axis A-A of the hard landing indicator 40 and projects from an outer surface of the main plate 43. One or more slots 46 are defined through each flange 45. The slots 46 are shaped and sized to receive an attachment means 50 (see FIG. 9 for an example), such as a zip tie, a strap with a strap lock, a band, etc., to attach the hard landing indicator 40 to the landing gear 10 (i.e. to secure the hard landing indicator 40 on one of the torque links 21, 22). In FIG. 5, each flange 45 has two slots 46, each shaped and sized to receive its own attachment means 50. In alternate embodiments, the slots 46 may be grooves defined in the flanges 45, such that the slots 46 are open at one end (instead of being holes through the flanges 45). This may facilitate engagement of the attachment means 50 in the slots 46 and still help to keep the attachment means 50 in place on the main plate 43.

In FIGS. 5 and 6, a first flange 45 and a second flange 45' are present on the main plate 43. The second flange 45' may or may not extend parallel to the first flange 45, such that the second flange 45' may be disposed obliquely (i.e. at angle) relative to the first flange 45. In some cases, the flanges 45, 45' form elongated ribs which help to rigidify the main plate 43. The elongated rib may be straight (i.e. partially or entirely straight) and/or have a profiled shape including curved portions. The second flange 45' may or may not include a slot 46. Where the second flange 45' includes such slot(s) 46, the attachment means 50 may also pass through said slots 46 in the second flange 45'. The slots 46 may prevent the attachment means 50 from slipping off the hard landing indicator 40 during operation when the hard landing indicator 40 is secured onto the landing gear 10 with the attachment means 50. In an alternate embodiment, instead of attaching the hard landing indicator 40 on the landing gear 10 with separate attachment means 50 such as zip ties, the attachment means 50 are an integral part of the hard landing indicator 40, for instance an integral part of the main pate 43 and/or at least one of the side plates 44. This may reduce the number of separate parts and facilitate handling and installation of the hard landing indicator 40 on the landing gear 10. For instance, in an embodiment, the attachment means 50 includes an elongated extension of the side plate 44 wrapping at least partially about the component of the landing gear 10 (e.g. wrapping about one of the torque links 21, 22). In addition to or instead of the mechanical attachment means 50, the hard landing indicator 40 may be adhesively bonded to the component of the landing gear 10, for instance adhesively bonded to either one of some of the upper surface 24 and side surfaces 26, 27 of the torque link (21,22). In some cases, although the attachment means 50 may include an elongated extension of the side plate 44 wrapping at least partially about the component of the landing gear 10, adhesively or not bonded to the component of the landing gear 10, the attachment means 50 may additionally include zip ties (or similar), as discussed above. This may provide an additional level of safety when securing the hard landing indicator 40 to the landing gear 10.

Figure 8:
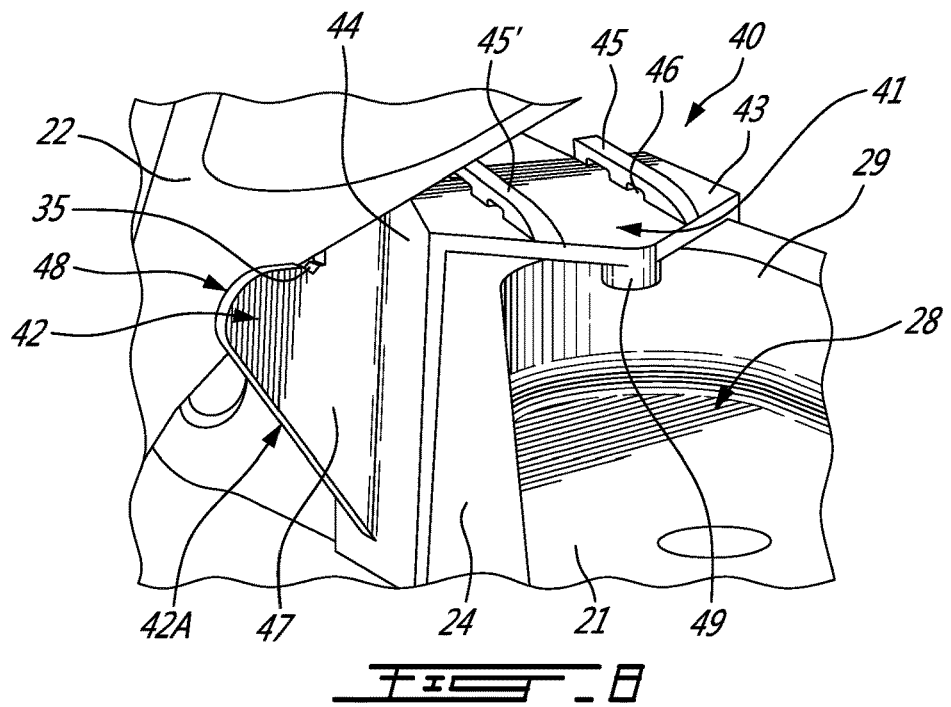
FIG. 8 is another perspective view of the hard landing indicator of FIG. 4 mounted on the component of the torque link assembly shown in FIG. 7.

FIGS. 7 and 8 show the hard landing indicator 40 positioned on the lower torque link 21. The hard landing indicator 40 has a stud, peg, knob or projection 49 extending outwardly from an inner surface of the main plate 43. Dimensions and shapes of the projection 49 may vary as required. For example, in the depicted embodiment, the projection 49 is cylindrical and extends from the inner surface of the main plate 43. The projection 49 may have any other suitable shape in other embodiments. Upon installing the hard landing indicator 40 on the lower torque link 21, the hard landing indicator 40 is displaced until the projection 49 abuts against the recess wall 29 of the recessed region 28. As such, when the hard landing indicator 40 is mounted on the lower torque link 21 at the location it is intended to be installed, the projection 49 may prevent movement of the hard landing indicator 40 along the lower torque link 21 in a direction that extends along the longitudinal axis B-B of the lower torque link 21 toward the hinge 23A. In other words, when the projection 49 engages the recess wall 29, the hard landing indicator 40 is restricted from moving longitudinally along the longitudinal axis B-B of the lower torque link 21 toward the hinge 23A. The projection 49 may thus act as a positioning means to position the hard landing indicator 40 on the component of the landing gear 10.

Referring to FIG. 8, the second portion 42 of the hard landing indicator 40 includes, or is the form of, a tab 42A. The tab 42A extends from one of the side plates 44 and is transverse to the side plate 44. The tab 42A may have different shapes. In the embodiment shown in FIG. 8, the tab 42A has opposite first and second side surfaces 47 and a peripheral surface 48. During a hard landing of the aircraft 1, as the upper torque link 22 is displaced toward the lower torque link 21, the upper torque link 22 impacts the peripheral surface 48 of the tab 42A and leaves a visible marking 35 (see FIG. 8). If the visible marking 35 is not present on the tab 42A, then it can be concluded that a hard landing of the aircraft 1 did not occur. During most landings of the aircraft 1, the upper torque link 22 will not impact the peripheral surface 48 of the tab 42A and leave the visible marking 35. In an embodiment, the tab 42A may have a thin and elongated body shaped as a fin. The tab 42A may extend outwardly from one of the side plates 44 transversely to the longitudinal axis A-A of the main plate 43 (see FIG. 5). A cross-sectional shape of the tab 42A may vary along a height of the tab 42A.

Referring to FIG. 5, the peripheral surface 48 may include a first and a second flat portions $48_1$, $48_2$ extending transversally from each other, forming a projecting corner $48_3$, and an inwardly curved portion $48_4$ extending from the second flat portion $48_2$ and forming an apex $48_5$ before extending toward the side plate 44. In other embodiments, the tab 42A may take different shapes. The shape of the tab 42A may be selected to offer enough strength to prevent fragmentation and thus avoid detachment of broken fragments of the tab 42A to be left on the tarmac after landing, to ensure robustness of the tab 42A, and/or to ensure the visible marking 35 be easily witnessed by an observer.

Referring to FIGS. 7 and 8, the second portion 42, which receives the impact from the component of the landing gear 10 in the case of a hard landing, is not frangible, such that the second portion 42 should not detach or shear from the remainder of the hard landing indicator 40 upon receiving the impact resulting from a hard landing. As such, the second portion 42, for instance the tab 42A, may be irreversibly deformed upon being impacted, whereby the visible marking 35 due to the impact may take the form of a notch or divot in the peripheral surface 48 of the tab 42A. In an alternate embodiment, the visible marking 35 may be in the form of a line or scratch in the peripheral surface 48. In an embodiment, the second portion 42 has a bright colour such as yellow or white. It is expected that the hard landing indicator 40 will be covered in dirt and grease during operation of the aircraft because of its location on the landing gear 10. In the embodiment where the second portion 42 has the bright colour, the visible marking 35 created by the impact will form a line, scratch, divot, notch, etc. that is brighter than adjacent portions of the dirty second portion 42 and thus be more clearly visible. It will therefore be appreciated that the visible marking 35 left on the second portion 42 by the component of the landing gear 10 does not disturb or alter the structural integrity of the second portion 42 or the hard landing indicator 40, and does not result in portions of the hard landing indicator 40 being broken off or separate from a remainder of the hard landing indicator 40. This contrasts with some conventional devices, whose impacted parts displace, break, or are torn off from the remainder of the device.

In an embodiment, the hard landing indicator 40 may be made entirely or partially of a thermoplastic material, for example Polytetrafluoroethylene (PFTE). Other materials may be used, such as other polymeric materials (e.g. nylons). At least the second portion 42 may be made from such a material. Such a plastic second portion 42 may be more easily deformable/markable upon being impacted by the component of the landing gear 10, which is typically made of a rigid material such as an metal alloy (e.g. aluminium allow, titanium alloy, metal alloy, etc.). The hard landing indicator 40 may be injection molded as a single piece, such that, for example, the main plate 43 and the side plates 44 may be integrally molded to one another, which may reduce manufacturing costs and render it easily to manufacture. Other materials and/or manufacturing method may be used to manufacture the hard landing indicator 40. The material(s) used for manufacturing the hard landing indicator 40 may be selected for their capacity to withstand degradation from chemical products, such as oil or other hydraulic fluids of the aircraft 1 and landing gear 10 and/or able to withstand extreme temperature ranges.

Referring to FIGS. 7 and 8, there is disclosed a method for installing the hard landing indicator 40 on the landing gear 10. The method includes securing the first portion 41 of the hard landing indicator 40 on the first component of the landing gear 10 to position the second portion 42 of the hard landing indicator 40 such that it may project outwardly from the first portion 41 within the path of displacement of the second component of the landing gear 10 toward the first component of the landing gear 10. More particularly, in an embodiment where the first portion 41 includes the main plate 43 and side plate 44, securing the first portion 41 includes positioning the first portion 41 such that the main plate 43 abuts against the upper surface of the lower torque link and the side plate 44 abuts on the side surface 26 of the lower torque link 21. In the embodiment where the hard landing indicator 40 includes opposite first and second side plates 44, securing the first portion 41 includes positioning the first portion 41 such that the first one of the side plates 44 abuts against one of the side surfaces 26, 27 of the torque link 21 and the second one of the side plates 44 (e.g. the lip) abuts against the other one of the side surfaces 26, 27. Stated differently, the main plate 43 and the pair of opposite side plates 44 straddle respectively the upper surface 24 and first and second side surfaces 26, 27 of the lower torque link 21. As the pair of opposite side plates 44 may have the same acute angle B relative to the longitudinal axis A-A of the hard landing indicator 40 as that of the side surfaces 26, 27 relative to the longitudinal axis B-B of the lower torque link 21, movement in a direction along the longitudinal axis B-B of the lower torque link 21 is prevented when the first portion 41 is positioned where it is intended on the lower torque link 21. In other words, when positioned on the torque link 21, the hard landing indicator 40 may be restricted from sliding in the direction where the side surfaces 26, 27 of the torque link 21 diverge from one another. The pair of obliquely opposite side plates 44 of the hard landing indicator 40 may therefore act as a positioning means to position the hard landing indicator 40 on complementary surfaces of a landing gear 10.

In an embodiment, where the hard landing indicator 40 has the projection 49 discussed above, positioning the hard landing indicator 40 further includes engaging the projection 49 in the recessed region 28 of the torque link 21, 22. As such, the hard landing indicator 40 is prevented from moving in a direction extending along the longitudinal axis B-B of the torque link 21, 22. In embodiments where the hard landing indicator 40 includes only one oblique side plate 44 and the projection 49, the hard landing indicator 40 may be positioned on the torque link 21, 22 at a specific location, by locating where the single oblique plate 44 may abut against one of the side surfaces 26, 27 of the torque link 21, 22 and where the projection 49 may abut against the recess wall 29. When the hard landing indicator 40 is installed in this location, this may cause the hard landing indicator 40 to be located at one end of the recessed region 28, adjacent one longitudinal end of the torque link 21, 22, in a state where it may no longer substantially move along the longitudinal axis B-B of the torque link 21, 22.

More particularly, the single side plate 44 prevents the hard landing indicator 40 from moving in a direction along the longitudinal axis B-B extending away from the hinge 23A of the torque link assembly 20, and the projection 49 prevents the hard landing indicator 40 from moving in a direction along the longitudinal axis B-B toward the hinge 23A. In an embodiment, this may provide an efficient way to position the hard landing indicator 40 at a predetermined place on the torque link 21, 22 in the correct orientation, such that the second portion 42 is positioned in the path of displacement of the other torque link 21, 22 to be impacted thereby during a hard landing. These positioning means, including at least one oblique side plate 44 and the projection 49, may thus prevent incorrect installation of the hard landing indicator 40 or its movement during operation of the landing gear 10 and/or aircraft 1. In this location, the hard landing indicator 40 may then be attached using the attachment means 50. In embodiments where the attachment means 50 are zip ties, the zip tie(s) may be engaged within the slot(s) 46 of the flange(s) 45 and wrapped about the torque link 21, 22, or a portion of the torque link 21, 22. The attachment means 50 may then be tightened, so that the hard landing indicator 40 may be immovably secured to the landing gear 10.

After having experienced a hard landing of the aircraft, the second portion 42 of the hard landing indicator 40, which may be or include the tab 42A discussed above, will have been marked with the visible marking 35. The visible marking 35 indicates to an observer that a hard landing occurred and that the aircraft 1 should be serviced and inspected for possible structural damages. More particularly, detecting a hard landing of the aircraft 1 may comprise visually observing the visible marking 35 on the hard landing indicator 40 caused by the impact of a second component of the landing gear 10 with the hard landing indicator 40. Before putting the aircraft 1 back in service, the marked hard landing indicator 40 may be removed from the landing gear 10 (e.g. by cutting or otherwise removing the attachment means 50) and replaced by an unaffected (i.e. new and/or undeformed and/or unmarked) hard landing indicator 40. The installation procedure may thus be repeated.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A landing gear for an aircraft, comprising:
a torque link assembly including an upper torque link and a lower torque link hingedly connected to one another at a common pivot, the upper and lower torque links having adjacent first and second side surfaces displaceable toward one another in a scissor-like manner upon the aircraft experiencing a landing;
a hard landing indicator secured to one of the upper and lower torque links and having a part oriented toward the other one of the upper and lower torque links, the other torque link impacting the part upon the other torque link being displaced toward the hard landing indicator by a hard landing of the aircraft, an impact of the other torque link with the part leaving a visual mark thereon.

2. The landing gear as defined in claim 1, wherein the first portion includes a main plate and at least one side plate projecting from a side of the main plate away from the other torque link, the second portion being transverse to the at least one side plate.

3. The landing gear as defined in claim 2, wherein the hard landing indicator is secured to the lower torque link, the lower torque link having an upper surface, a lower surface and side surfaces extending between the upper and lower surfaces, the main plate abutting the upper surface and the at least one side plate abutting one of the side surfaces of the lower torque link.

4. The landing gear as defined in claim 3, wherein the side surfaces of the lower torque link extend obliquely relative to each other between opposite first and second longitudinal ends of the lower torque link, the at least one side plate of the hard landing indicator being oblique relative to a longitudinal axis of the hard landing indicator.

5. The landing gear as defined in claim 3, wherein the lower torque link includes a recessed region spaced inwardly from the upper surface and between the side surfaces, the recessed region delimited by a recess wall extending inwardly from the upper surface, the hard landing indicator having a projection extending outwardly from an inner surface of the main plate, the projection abutting against the recess wall of the recessed region.

6. The landing gear as defined in claim 2, wherein the second portion of the hard landing indicator is a tab, the tab extending from the at least one side plate toward the path of displacement of the other torque link and being transverse to said side plate.

7. The landing gear as defined in claim 6, wherein the tab has opposite first and second side surfaces and a peripheral surface extending between the first and second side surfaces, a portion of the peripheral surface receiving the impact from the other torque link upon the aircraft experiencing the hard landing.

8. The landing gear as defined in claim 2, wherein the main plate includes at least one flange, the at least one flange extending along a length of the main plate.

9. The landing gear as defined in claim 8, wherein at least one slot is defined through the at least one flange, the landing gear comprising an attachment means inserted through the slot to attach the hard landing indicator to the one of the upper and lower torque links.

10. A hard landing indicator mountable to a landing gear of an aircraft, the landing gear having first and second components having adjacent first and second side surfaces displaceable toward each other in a scissor-like manner upon the aircraft experiencing a landing, the hard landing indicator comprising:

a first portion securable to the first component of the landing gear;

a second portion projecting from the first side surface so as to be positioned within a path of displacement of the second component toward the first component, the second portion being impacted and marked by the second component upon the second component being displaced by a hard landing of the aircraft.

11. The hard landing indicator as defined in claim 10, wherein the first portion includes a main plate and at least one side plate projecting from a side of the main plate, the second portion being transverse to the at least one side plate.

12. The hard landing indicator as defined in claim 11, wherein the at least one side plate is oblique relative to a longitudinal axis of the hard landing indicator, an acute angle being defined between the at least one side plate and the longitudinal axis.

13. The hard landing indicator as defined in claim 11, wherein the main plate and the at least one side plate are integrally molded with one another.

14. The hard landing indicator as defined in claim 10, wherein the second portion is a tab having an opposite first side surface and a second side surface and a peripheral surface extending between the first side surface and the second side surface, a portion of the peripheral surface receiving the impact from the second component of the landing gear upon the aircraft experiencing the hard landing.

15. The hard landing indicator as defined in claim 11, wherein the main plate includes at least one flange, the at least one flange extending along a length of the main plate.

16. The hard landing indicator as defined in claim 15, wherein at least one slot is defined through the at least one flange for receiving an attachment means to attach the hard landing indicator to the first component of the landing gear.

17. The hard landing indicator as defined in claim 11, further comprising a projection abutting against a portion of the first component of the landing gear upon securing the hard landing device thereon.

18. A method for installing a hard landing indicator on a landing gear of an aircraft, the landing gear including first and second components hingedly connected to one another and having adjacent first and second side surfaces displaceable towards each other in a scissor-like manner, the method comprising: securing a first portion of the hard landing indicator on the first component of the landing gear to position a second portion of the hard landing indicator projecting from the first side surface within a path of displacement of the second component of the landing gear toward the first component.

19. The method as defined in claim 18, wherein securing the first portion includes preventing the hard landing indicator from being displaced along the first component of the landing gear.

* * * * *